US012560707B2

(12) United States Patent
Zimmerman et al.

(10) Patent No.: US 12,560,707 B2
(45) Date of Patent: Feb. 24, 2026

(54) THREE-DIMENSIONAL FORWARD-LOOKING SONAR TARGET RECOGNITION WITH MACHINE LEARNING

(71) Applicant: FarSounder, Inc., Warwick, RI (US)

(72) Inventors: Matthew Jason Zimmerman, North Kingstown, RI (US); Heath Henley, Warwick, RI (US); Austin Berard, North Smithfield, RI (US); Evan Lapisky, South Kingstown, RI (US)

(73) Assignee: FarSounder, Inc., Warwick, RI (US)

( * ) Notice: Subject to any disclaimer, the term of this patent is extended or adjusted under 35 U.S.C. 154(b) by 207 days.

(21) Appl. No.: 16/809,983

(22) Filed: Mar. 5, 2020

(65) Prior Publication Data

US 2020/0379104 A1     Dec. 3, 2020

Related U.S. Application Data

(63) Continuation of application No. PCT/US2019/055435, filed on Oct. 9, 2019.

(Continued)

(51) Int. Cl.
*G01S 15/04*        (2006.01)
*G01S 7/52*        (2006.01)
(Continued)

(52) U.S. Cl.
CPC .......... *G01S 15/04* (2013.01); *G01S 7/52003* (2013.01); *G01S 7/53* (2013.01); *G01S 15/89* (2013.01)

(58) Field of Classification Search
None
See application file for complete search history.

(56) References Cited

U.S. PATENT DOCUMENTS

| | | | |
|---|---|---|---|
| 6,449,215 B1 * | 9/2002 | Shell ...................... | G01S 15/89 |
| | | | 367/7 |
| 7,035,166 B2 | 4/2006 | Zimmerman et al. | |

(Continued)

FOREIGN PATENT DOCUMENTS

| | | |
|---|---|---|
| JP | 2016151460 A | 8/2016 |
| WO | 2014/126847 A2 | 8/2014 |

OTHER PUBLICATIONS

Kim, Convolutional Neural Network-based Real-time ROV Detection using Forward-looking Sonar image, 2016, IEEE/OES Autonomous underwater vehicles, pp. 396-400 (Year: 2016).*

(Continued)

*Primary Examiner* — Luke D Ratcliffe
*Assistant Examiner* — Vikas Atmakuri
(74) *Attorney, Agent, or Firm* — Sullivan & Worcester LLP; Zachary D. Hyde

(57) ABSTRACT

Machine learning algorithms can interpret three-dimensional sonar data to provide more precise and accurate determination of seafloor depths and in-water target detection and classification. The models apply architectures for interpreting volumetric data to three-dimensional forward-looking sonar data. A baseline set of training data is generated using traditional image and signal processing techniques, and used to train and evaluate a machine learning model, which is further improved by additional inputs to improve both seafloor and in-water target detection.

21 Claims, 9 Drawing Sheets

Related U.S. Application Data

(60) Provisional application No. 62/743,768, filed on Oct. 10, 2018.

(51) Int. Cl.
*G01S 7/53* (2006.01)
*G01S 15/89* (2006.01)

(56) References Cited

U.S. PATENT DOCUMENTS

| | | | | |
|---|---|---|---|---|
| 7,355,924 | B2 * | 4/2008 | Zimmerman | G01S 7/53 |
| | | | | 367/131 |
| 8,929,178 | B2 * | 1/2015 | Lichter | G01S 15/87 |
| | | | | 367/173 |
| 8,942,062 | B2 * | 1/2015 | Debrunner | G01S 15/89 |
| | | | | 367/173 |
| 8,964,507 | B2 * | 2/2015 | Bachelor | G10K 11/343 |
| | | | | 367/103 |
| 10,281,577 | B2 * | 5/2019 | Hunt | G01S 15/96 |
| 10,429,505 | B2 * | 10/2019 | Steenstrup | G01S 7/53 |
| 10,514,451 | B2 * | 12/2019 | Brown | G01S 7/6263 |
| 10,914,810 | B2 * | 2/2021 | Laster | G01S 7/6272 |
| 2004/0165478 | A1 | 8/2004 | Harmon et al. | |
| 2005/0270905 | A1 * | 12/2005 | Patterson | G06V 10/255 |
| | | | | 367/88 |
| 2007/0025183 | A1 | 2/2007 | Zimmerman et al. | |
| 2010/0046327 | A1 * | 2/2010 | Orlin | G06F 18/21 |
| | | | | 367/88 |
| 2015/0369908 | A1 | 12/2015 | Zimmerman et al. | |
| 2016/0306040 | A1 | 10/2016 | Hunt et al. | |
| 2017/0371039 | A1 * | 12/2017 | Clark | G01S 15/87 |
| 2020/0116858 | A1 * | 4/2020 | Nagai | G01S 7/52003 |

OTHER PUBLICATIONS

EchoPilot Marine Electronics Ltd.; "EchoPilot 3D Forward Looking Sonar"; EchoPilot; The Sonar People; as of Jul. 6, 2017; 2 pages; England. (Year: 2017).*

Echopilot website for Brochure regarding 3dfls "https://echopilot.com/products/3d-forward-looking-sonar/brochure_fls_3d_fls3d-b01issue01_d0561_18102017/" (Year: 2017).*

EchoPilot, EchoPilod 3D Forward Looking Sonar, Youtube, https://www.youtube.com/watch?v=V47s-b973yo (Year: 2012).*

Extended European Search Report issued in European Application No. 19904281.3, date of mailing: Jun. 3, 2022, 9 pages.

Cicek, 2016, 3D U-net: Learning dense volumetric segmentation from sparse annotation, Lecture Notes in Computer Science, vol. 9901 LNCS (7 pages).

Dzieciucb, 2016, Non-linear Convolutional Neural Network for Automatic Detection of Mine-Like Objects in Sonar Imagery, Proceedings of the 4th International Conference on Applications in Nonlinear Dynamics (ICAND 2016), Abstract Only.

Greethalakshmi, 2011, A study on detecting and classifying underwater mine like objects using image processing techniques, International Journal on Computer Science and Engineering, 3(10):3359-3366.

International Search Report and Written Opinion issued in International Patent Application No. PCT/ US2019/55435, date of mailing: Jun. 25, 2020, 10 pages.

Kingma, 2014, Adam: A Method for Stochastic Optimization, [Online] Available: http:/ /arxiv.org/abs/1412.6980 [13], 15 pages.

Livne, 2018, Thoughts on object detection using convolutional neural networks for forward-looking sonar, 4(3):182-184.

Maturana, 2015, VoxNet: A 3D Convolutional Neural Network for Real-Time Object Recognition, IROS, pp. 922-928.

Milletari, 2016, V-Net:Fully Convolutional Neural Networks for Volumetric Medical Image Segmentation, pp. 1-11.

Ronneberger, 2015, U-Net: Convolutional Networks for Biomedical Image Segmentation, [Online]Available:http://arxiv.org/abs/1505.04597, 8 pages.

Valdenegro-Toro, 2017, Best Practices in Convolutional Networks for Forward-Looking Sonar Image Recognition, [Online] Available: http://arxiv.org/abs/1709.02601, 9 pages.

Wang, 2017, Review and prospect of Underwater Target Feature Extraction Based on Active Sonar, Advances in Engineering Research, 128:34-37.

Zeiler, 2012, AD ADEL TA: An Adaptive Learning Rate Method, [Online] Available:http:j /arxiv.org/abs/1212.5701 (6 pages).

Zhou, 2017, VoxelNet: End-to-End Learning for Point Cloud Based 3D Object Detection, [Online]. Available: http:/ /arxiv.org/abs/1711.06396, 10 pages.

* cited by examiner

THREE-DIMENSIONAL FORWARD-LOOKING SONAR TARGET RECOGNITION WITH MACHINE LEARNING

CROSS-REFERENCE TO RELATED APPLICATIONS

This application is a continuation of International Application PCT/US2019/055435, filed Oct. 9, 2019, which claims the benefit of and priority to U.S. Provisional Application Ser. No. 62/743,768, filed Oct. 10, 2018, the contents of each of which are incorporated by reference in their entirety.

FIELD OF THE INVENTION

The present discloser relates to sonar systems, and particularly to machine learning algorithms for analyzing three-dimensional forward-looking sonar data.

BACKGROUND

Safely navigating a boat or other seafaring vessel without running aground or hitting any underwater objects or hazards requires sensor equipment that can detect the seafloor or other in-water targets. Operators need to be able to interpret the data picked up by the sensors to determine whether a maneuver is necessary in order to maintain a safe course. Identifying underwater targets is important for other purposes as well. For example, fishing vessels may need to locate and identify marine life or other in-water features.

Many boats rely on sonar for bathymetric measurements and to detect underwater objects. Sonar systems use sound propagation to map the seafloor and identify objects under the surface of the water. Three-dimensional forward-looking sonar systems generate large amounts of data that updates on the order of seconds, which makes the data difficult to interpret for a boat operator. These systems have therefore been limited in their application for real-time navigation uses.

SUMMARY

The present disclosure provides sonar systems and related methods that utilize machine learning algorithms for interpreting three-dimensional sonar data, which allow more precise and accurate determination of seafloor depths and in-water target detection and classification that previously available with traditional detection algorithms. The disclosed machine learning models are based on architectures for interpreting volumetric data, which the present invention has applied to three-dimensional forward-looking sonar (3D-FLS) data. According to the invention, a baseline set of training data is generated using traditional image and signal processing techniques, and used to train and evaluate a machine learning model. The model is further improved with additional data inputs to eliminate false positives and false negatives, for both seafloor and in-water target detection.

Seafloor determinations by the model are improved with training data from a variety of sources. For example, inputs can include bathymetry survey data from an independent reference source or data from other sensors such as single beam or multibeam downlooking sonar, which can be correlated to other georeferenced input data that overlap during the course of the vessel's normal transit. Manual label editing tools for 3-dimensional backscatter strength data can be implemented by an operator to further improve the training data. Other inputs are described herein which can be used to improve and extend the seafloor detection in the baseline training set. The added range and number of seafloor points in the training data can be fit by the machine learning model with additional input features, parameters, or layers. As more features are input into the model, the number of layers and trainable parameters are increased to improve performance.

For in-water targets, the training data includes georeferenced in-water target locations derived from independent bathymetric surveys, surface radar data, automatic identification system data, historical nautical chart data, aerial survey data, visual observations, fish trawl catch data, and/or manually labeled outputs of traditionally processed 3D sonar data.

Systems of the invention include a sonar processor capable of extracting target detections and target classifications from the sonar sensor's data by means of a supervised machine learning algorithm. The input to the algorithm includes a 3-dimensional array of backscatter strength from the sonar sensor and optionally one or more additional inputs. Additional inputs can be sensor roll orientation, sensor pitch orientation, sensor heave, sensor rate of turn in one, two, or three dimensions, sensor heading, sensor course, sensor latitude/longitude, water temperature, water salinity, vessel speed, vessel course, and sensor acceleration measurements in one, two or three dimensions.

Aspects of the invention provide a method for detecting and classifying underwater features. The method involves obtaining three-dimensional forward-looking sonar (3D-FLS) data, providing the 3D-FLS data as input to a machine learning algorithm, and using the algorithm to detect a feature in the 3D-FLS data and classify the feature as seafloor or an in-water target.

In embodiments, the 3D-FLS data is a point cloud of backscatter strength data which can be obtained from a 3D-FLS system mounted on the hull of a boat. The 3D-FLS data may also include additional data or metadata such as sensor acceleration readings, gyroscope readings, sensor roll orientation, sensor pitch orientation, sensor heave, sensor heading, sensor course, sensor latitude, sensor longitude, water temperature, water salinity, and/or sound speed profile. The algorithm can run on a processor operably connected to the 3D-FLS system.

In some embodiments, the algorithm is a convolutional neural network. The algorithm can be trained on labeled 3D-FLS training data, and may generate an output comprising a classification for each point in the 3D-FLS data, the classification representing a likelihood that the point corresponds to (i) seafloor, (ii) an in-water target, or (iii) background. In some embodiments, the in-water targets are further classified as being wakes, buoys, fish, boats, and/or engine noise.

The method can further involve obtaining data from a secondary source and improving the labeled 3D-FLS training data with the secondary source data. The secondary source can be, for example, manually labeled volumetric backscatter strength data, bathymetric survey data from a reference source, multibeam echosounder data (MBES) obtained from the same vessel or a different vessel as the 3D-FLS data, single beam echosounder data (SBES) obtained from the same vessel obtained from the same vessel as the 3D-FLS data, 3D-FLS data obtained from the same sonar system at a different angle or time, nautical chart data, radar data, and automatic identification system (AIS)

data. The secondary source data may comprise information about position, speed, and heading.

In related aspects, the invention provides a system for real-time detection and classification of underwater features. The system includes a three-dimensional forward-looking sonar (3D-FLS) device configured to insonify a region ahead of a vessel and collect 3D-FLS data and a processor operably coupled to the 3D-FLS device, the processor configured to run a machine learning algorithm on the 3D-FLS data to detect and classify features in the 3D-FLS data, the features comprising seafloor and in-water targets.

In embodiments, the 3D-FLS is mounted on the hull of a boat and the data it obtains is sonar return signals forming a volumetric point cloud of backscatter strength data. The 3D-FLS data may further include data or metadata such as sensor acceleration readings, gyroscope readings, sensor roll orientation, sensor pitch orientation, sensor heave, sensor heading, sensor course, sensor latitude, sensor longitude, water temperature, water salinity, and/or sound speed profile. The system can further include a display for displaying the features with labels indicating their classifications or classification likelihoods.

In embodiments, the algorithm may be a convolutional neural network. The algorithm can be trained on labeled 3D-FLS training data. The algorithm can be configured to generate an output comprising a classification for each point in the 3D-FLS data, the classification representing a likelihood that the point corresponds to (i) seafloor, (ii) an in-water target, or (iii) background. In embodiments, the processor is further configured to improve the training data with manually labeled volumetric backscatter strength data or reference seafloor data. The system may also include a downward-looking sonar such as an echosounder operably connected to the processor and configured to obtain the reference seafloor data. The algorithm can also be trained on 3D-FLS data collected from the 3D-FLS device at a different angle or time. The processor can be further configured to sub-classify the in-water targets as wake, buoys, fish, boats, and/or engine noise.

DETAILED DESCRIPTION

The present disclosure provides systems and methods for automatic real-time target detection in 3D-FLS data for navigation applications. With the present invention, a 3D-FLS sensor generates volumetric point clouds of data which are interpreted by an algorithm configured to detect both seafloor and in-water targets. The algorithm of the present invention can both learn from and make predictions on 3D-FLS data, providing superior outputs compared with traditional image and signal processing techniques. The algorithm can be further improved by training on one or more secondary sources of data as will be described below.

A vessel of the present invention can have a transducer module mounted on the hull which includes one or more sonar transmit or receive transducers and may optionally include some or all of the sonar processing electronics to run the algorithm, data collection, training, and processing functions described herein. Preferably, units within the transducer module are coupled to a display unit accessible to an operator who can be located within the vessel or remotely. A sonar system with such a transducer module may be used for a variety of purposes including, for example, seafloor surveys, mine detection, and recreational pursuits such as fishing. At least one of the sonar arrays is a forward-looking sonar, which can be used to detect dangerous shallows and obstacles ahead of the boat, or other objects in the water like shipwrecks, rock piles, fish, or other marine life. As will be described below, other sensors such as an echosounder are compatible with the invention as well.

Figure 1:
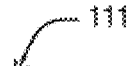
FIG. 1 shows a 3D forward looking sonar system.
Figure 1:
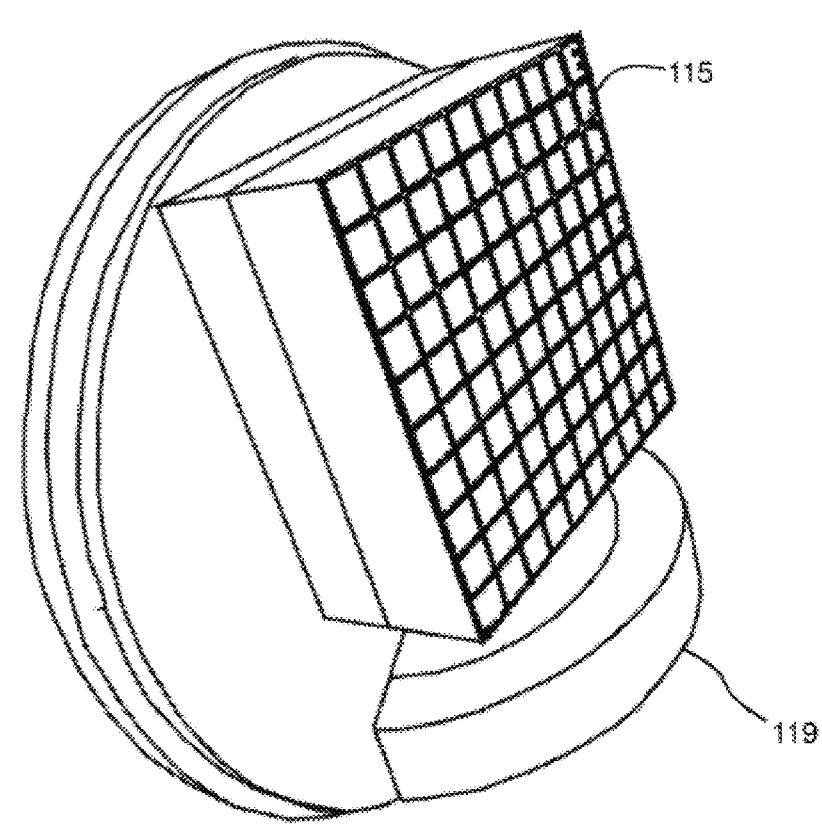

FIG. 1 depicts a 3D forward looking sonar (3D-FLS) system 111 according to certain embodiments. The forward looking sonar system 111 includes a transmit device 119 and receive array 115. Due to receiver capacitance properties receiver preamps may be located close to each receiver element. Due to the receiver channel count, the rest of the receiver electronics are most likely located in the transducer module. This reduces the number of individual conductors needed to extend from the transducer module to a processor module. The forward looking system 111 is capable of generating a 3-dimensional image ahead of the vessel with a single ping. In embodiments, the forward looking system 111 receiver array 115 consists of a 2-dimensional array with elements oriented such that the array has both vertical and horizontal directivity. In one embodiment of the invention, traditional beamforming is utilized in both the vertical and horizontal directions. In another embodiment, beamforming is utilized in the horizontal direction and interferometry is used in the vertical direction. In one variation of this embodiment, the receiver elements are shaped such that they are longer in the vertical orientation than the horizontal orientation. In one variation of the above embodiments, the receiver array is conformal to a non-flat shape. 3D sonar systems are described in U.S. Pat. No. 7,035,166 and U.S. Patent Publication No. 2015/0369908, the contents of each of which are incorporated by reference.

In the preferred embodiment, the transmit transducer 119 is separate from the receive array 115 and has horizontal and vertical beampatterns large enough that a single transmission can insonify the entire volume of interest ahead of the vessel and that this volume of interest corresponds to the entire vertical and horizontal coverage of the receiver system. In one variation of this embodiment, the transmitter consists of two or more horizontal rows such that the transmitted beampattern can be steered in the vertical direction by the use of standard phased or time delayed beam steering. The forward-looking system is preferably housed within a transducer module.

One of the challenges of 3D-FLS systems is that they can be difficult to interpret in real time by a human operator. 3D-FLS systems generate a large amount of data in the form of a volumetric point cloud, which updates on the order of seconds with each ping of the sonar system. Due to the large amount of data which changes quickly, it is very difficult for a human operator to use the data in real time for navigating a vessel.

The present disclosure therefore provides automatic target recognition for sonar-based systems for navigation in real-time using machine learning models to interpret and display the 3D-FLS data. Automatic target recognition algorithms can also be used for autonomous applications of navigational 3D-FLS. In embodiments of the invention, a navigational 3D-FLS system insonifies the volume ahead of the vessel (generally about 1000 meters forward at 60 degrees to port and starboard, or about 500 meters forward at 90 degrees to port and starboard) and collects the backscatter levels using a bow-mounted transducer array. The resulting data provides a 3D point cloud of target strength values in front of the vessel. Generally the system pings once every few seconds, for example every 1.6 seconds.

Figure 2:
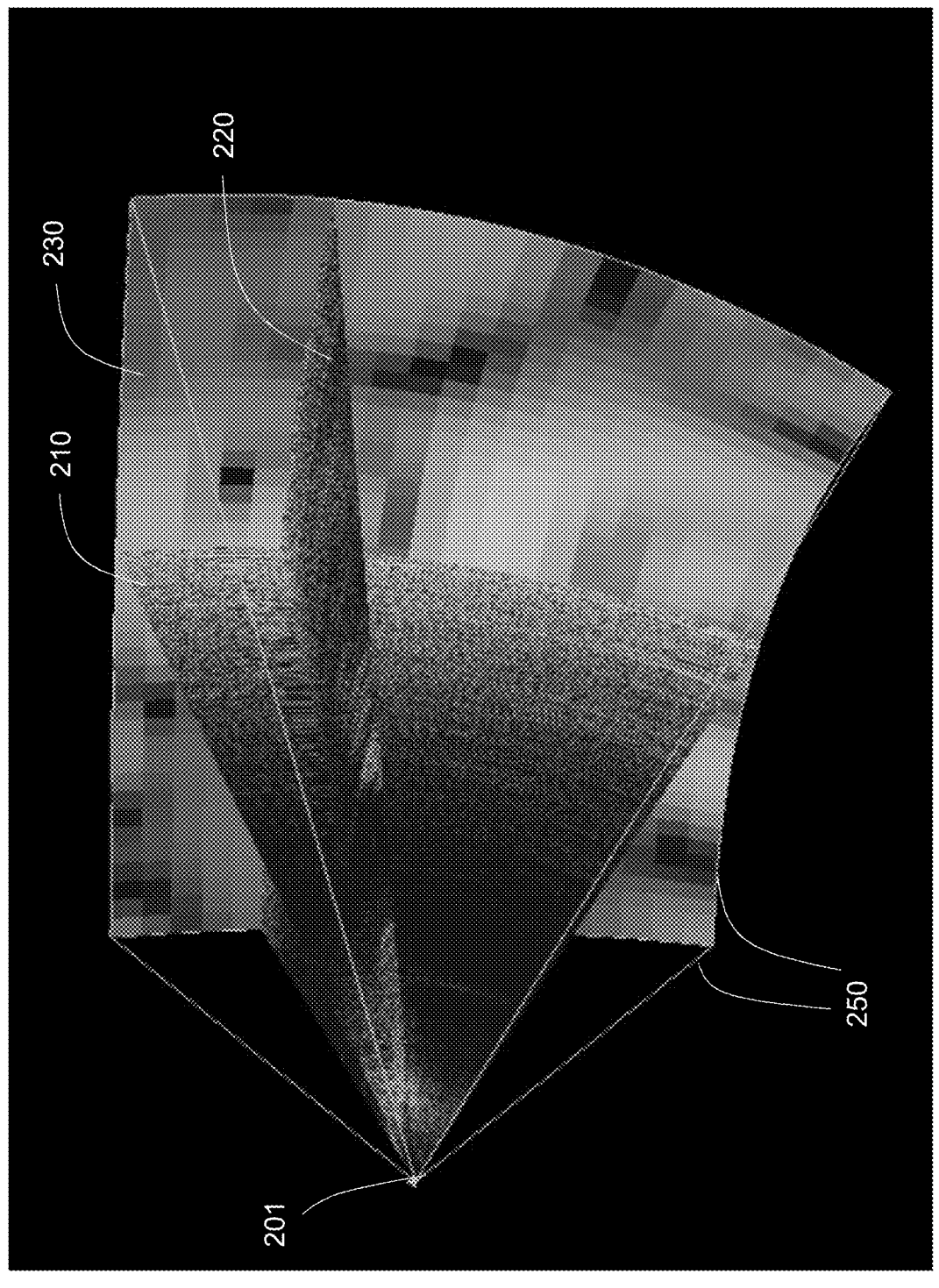
FIG. 2 shows an example of a 3D projection of target strength values from a single ping using a 3D-FLS.

FIG. 2 shows an example of a 3D projection of target strength values from a single ping using a 3D-FLS. The vessel located at point 201 emits a sonar signal in a forward-looking direction. The data is a dense cloud of backscatter information with relatively low signal-to-noise ratio (SNR). For clarity, the figure shows a vertical plane 210, a horizontal plane 220, and a radial plane 230, but it should be understood that data representing the entire volume defined by edges 250 is obtained. The system obtains a new volumetric point cloud of data with each ping.

The resulting data is processed by the transducer array. In the visualization shown in FIG. 2, the variations in tone correspond to target strength in decibels. For an operator to visually inspect the raw sonar data to identify location of the seafloor and any navigational hazards would require a great deal of training and attention. Given that the entire dataset refreshes rapidly, manual monitoring of the data to recognize targets and make navigation decisions is a demanding task. The automatic target recognition algorithms described herein therefore increase ease of use and comprehension of navigational 3D-FLS data.

Figure 3:
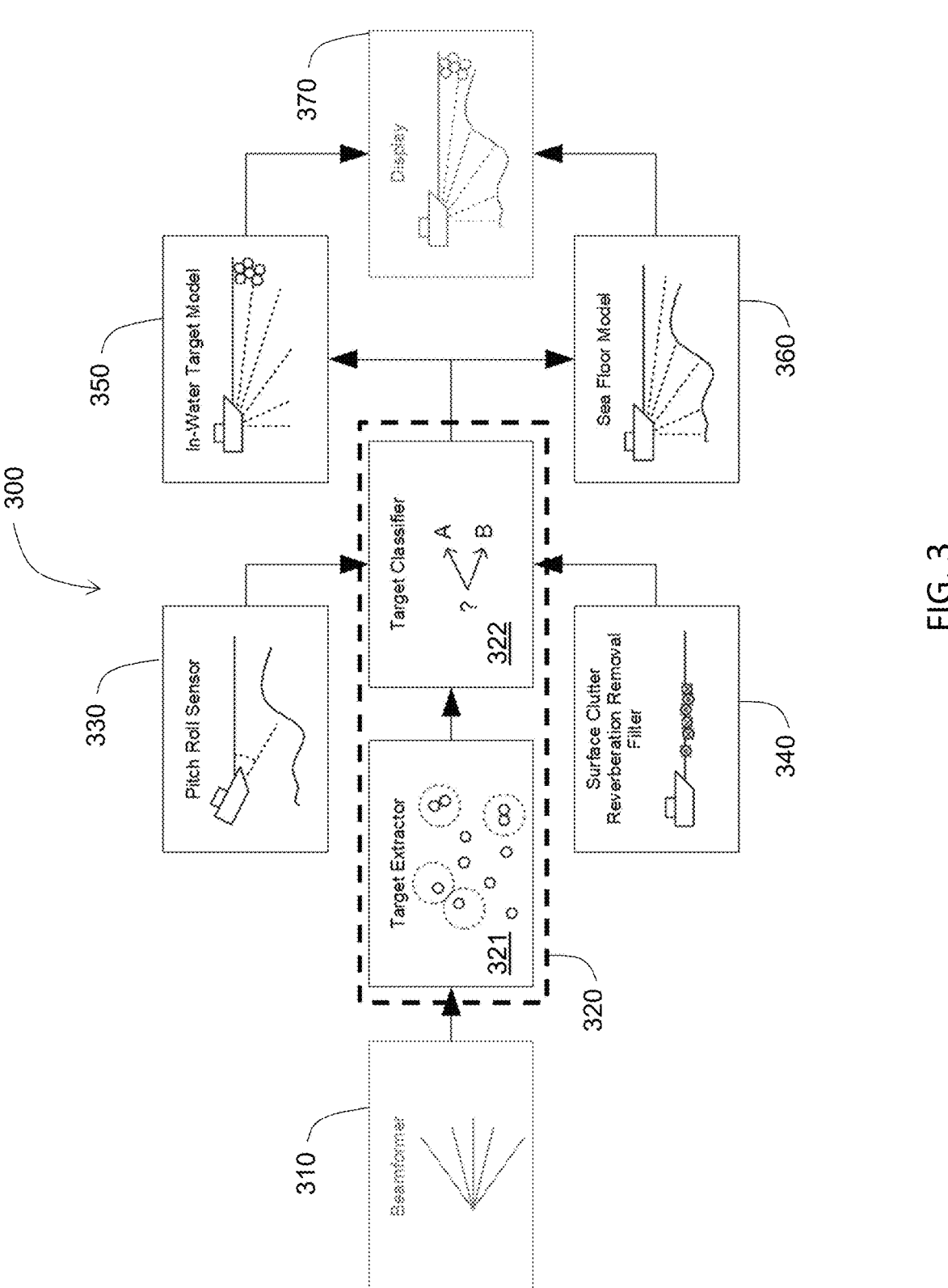
FIG. 3 shows a flowchart of signal and image processing techniques.

In order to make use of the 3D point cloud of backscatter results obtained using a 3D-FLS, as shown in FIG. 2, the data must be processed and presented in a way that is easy to understand for end users. FIG. 3 shows a flowchart of a processing chain 300 that uses traditional signal and image processing techniques to detect targets in the data and obtain information about the location of the seafloor and any navigational hazards ahead of the vessel. A beamformer 310 produces a volumetric plot of backscatter signals as a function of angle from a sonar signal transmitted in a forward direction and received by an array of receivers. The sonar returns enter a detection algorithm 320 defined by a target extractor 321 and a target classifier 322. The target extractor 321 determines features that likely represent objects in the data, and the target classifier 322 identifies whether the feature is the seafloor, an in-water target, or background. The target classifier 322 receives inputs from other sensors as well, such as a pitch roll sensor 330, which indicates the orientation of the vessel. A surface clutter reverberation removal filter 340 identifies echoes in the data indicative of sea surface clutter, and provides knowledge of the volume or surface causing the clutter to the target classifier 322. With these inputs, the target classifier 322 generates an in-water target model 350 and a sea floor model 360. These models can be combined into a single display 370 showing both seafloor and in-water targets, which can be used by an operator for vessel navigation. Additionally, the in-water targets can be further classified into a variety of subclasses including wakes, buoys, fish, moving target, stationary target, boat, or correlated noise (i.e. engine noise).

The detection algorithm of the present invention is a machine learning model that can interpret the data in real time. The disclosed machine learning based target detection methods improve upon other target detection or target recognition methods that have been developed for sonar applications. Traditional methods are based on determining peaks in sonar returns using either fixed or adaptive thresholding to classify points of data. Image processing techniques such as edge detection can be used in combination with thresholding in order to algorithmically detect targets.

With the present invention, a processor running the machine learning algorithm obtains the 3D point cloud of backscatter strength data from the 3D-FLS scanning the volume ahead of the vessel. The disclosed systems apply a machine learning model to the data to process the sonar data collected from a single ping within the sonar's ping cycle time.

Convolutional neural networks (CNNs) that implement 3D convolutional layers are a particularly useful model for image segmentation and object detection problems presented by sonar data. CNN frameworks have been used for detection of mine-like objects or small remotely operated vehicles in sonar images. But prior attempts at object detection in traditional forward looking sonar images were ineffective due to the typically lower signal-to-noise ratio in forward looking sonar data and the lack of publicly available labelled data. Prior forward looking sonar images detection considered short range, high resolution, 2D imaging sonars. The presently disclosed systems and methods use 3D-FLS data and can generate a 3D point cloud of target strength or backscatter strength values.

While some CNN frameworks for analyzing volumetric point clouds of data have been used in autonomous driving and medical imaging applications such as MRI and confocal microscope data, the model disclosed here is the first to use 3D-FLS data. Additionally the disclosed model provides other secondary sources of data for improving the algorithm, thereby providing improved target detection performance over previously known CNN based models for 3D data.

In some embodiments, the disclosed system architecture is a modified version of a known CNN architecture for processing volumetric data such as the 3D U-Net and V-Net architectures. The architectures are described in Cicek et al., "3D U-net: Learning dense volumetric segmentation from sparse annotation," Lecture Notes in Computer Science (including subseries Lecture Notes in Artificial Intelligence and Lecture Notes in Bioinformatics), vol. 9901 LNCS, pp. 424-432, 2016; and Milletari et al., "V-Net: Fully Convolutional Neural Networks for Volumetric Medical Image Segmentation," pp. 1-11, 2016; both of which are incorporated herein by reference. In both architectures, the number of features layers can be tuned to reduce the GPU memory footprint.

Modified versions of the 3D U-Net and 3D V-Net architectures can be used to processes 3D-FLS data. Due to the size of the input data generated by the 3D-FLS sensor, the number of filters used in the volumetric convolutions is reduced from both the U-net and V-Net models so that the model can be trained successfully without running out of memory resources on an 8 GB Nvidia GTX 1070 GPU. In alternative embodiments, this could be run on a system with more available GPU memory. However, for deploying the network for real-time target detection on computers currently specified with Nvidia GTX 1050 (with 4 GB of GPU memory), the number of filters can be reduced.

In alternative embodiments, 2D versions of these models can be created by switching the 3D convolutions with 2D convolutions and tested by inputting 2D slices of the 3D input data into the model. For the same size GPU memory footprint, the 2D version of the model allow a greater number of filters to be considered at each layer, while neglecting information about the adjoining slices through the data.

Although the present disclosure generally refers to implementation on a CNN for image segmentation and object detection operations, it should be understood that the technology is applicable to supervised machine learning in general and is agnostic towards the specific type of machine learning algorithm. The model is compatible with different network architectures and loss function, optimizer, and/or hyperparameter combinations. The network architecture is important to the efficacy of any machine learning based model for a given application, and many different system architectures for processing 3D data can be used and/or improved with the methods disclosed herein.

Whether the model is a CNN or other type of supervised machine learning algorithm, the model is trained with inputs of 3-dimensional arrays of backscatter strengths, such as the array shown in FIG. 2. The number of voxels in such an array is on the order of millions. The initial training set of labeled data can be generated by a traditional algorithm such as the algorithm shown in FIG. 3 for turning sensor level data into a human readable map of detections. In some embodiments the training data can been cleaned of outliers either manually or via traditional post processing algorithms, by methods discussed in more detail below. The algorithm generates as output a "class" label for each point in the input volume, to identify the point as being either (1) background, (2) seafloor, or (3) in-water target. This produces an output with the same shape as the input in the first three dimensions but an additional dimension of a three-element vector appended to the end. The three-element vector in the last dimension represents the probability of a voxel being background, seafloor or in-water target.

In addition to training the machine learning model on training data developed from traditional processing algorithms, the present invention includes further inputs that can be added to enhance the performance of the detector. These inputs can be labeled data from secondary sources, which help improve upon the 3D-FLS data inputs. In some embodiments, the secondary data is from a trusted reference source or from crowdsourced data. In other embodiments, manually labeled data is added. In some embodiments, data from other types of sensors other than sonar is used to augment the 3D-FLS data. The algorithm can be continuously trained on these inputs as the system is operating and interpreting new signals.

Manually labeled seafloor or in-water targets can be added to the training data. Manually labeled data is especially useful for removing certain undesired features that can be recognized by an operator, such as vessel wakes or engine noise interference. To avoid training the model to continue to detect these targets, the invention provides, in an optional embodiment, a tool for manually cleaning those features from the data. The tool may be operably associated with a display that the sonar operator can interact with. The operator can inspect each ping on the display and tag any objects identified as clutter, wake, or interference. By training the model with these manually labeled tags the algorithm can thus learn to ignore certain detections that are not indicative of actual targets.

In addition to manually labeled data, the algorithm can accept as input data from other sources as well. The invention contemplates different approaches for improving the training data in each of the two classes of features: seafloor and in-water targets (IWTs). These approaches can be used separately or in conjunction with one another.

Seafloor detection can be improved with reference to other sources of information about depths. In general, seafloor detection measures the depth of the seafloor in front of the vessel. However in accordance with the present invention these measurements can be supplemented with training data from a known reference source. For example, bathymetric survey data collected by the National Oceanic and Atmospheric Administration (NOAA) can be used to supplement detections of the seafloor generated by the 3D-FLS. The NOAA survey data is a useful supplement in part because it is collected using a higher resolution sensor (multibeam echosounder) and cleaned in post processing by a hydrographer. It is therefore likely to be a reasonably good estimate of the ground truth depth in the area, assuming that the area was surveyed somewhat recently. These surveys are added to a database within the training data containing the location and depth for the survey points.

Figures 4, 5, 6:
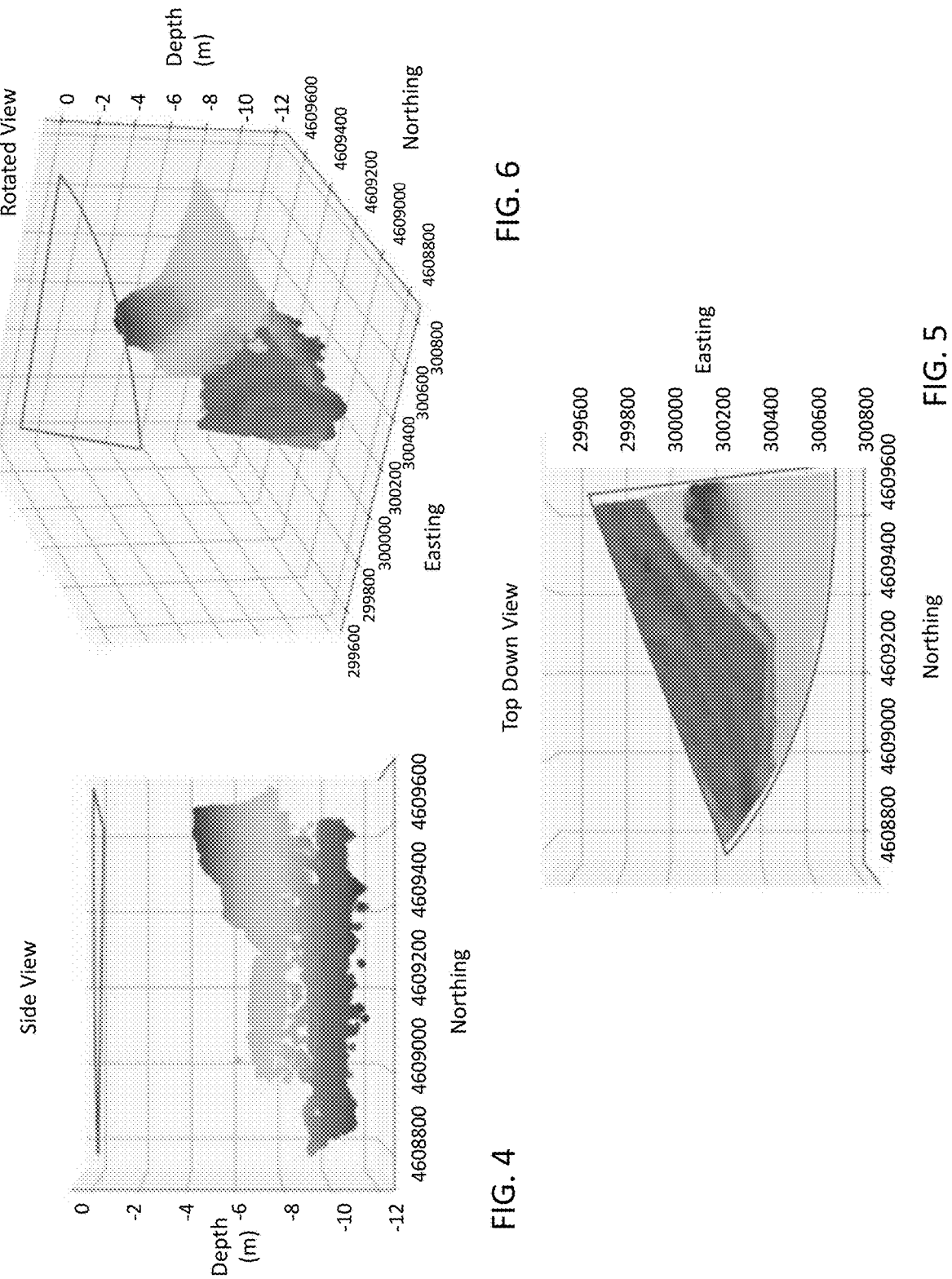
FIGS. 4-6 show survey data associated with a ping of a sensor.

For each ping the database is queried for surveyed points that are within the field of view (FOV) of the sensor. FIGS. 4-6 show NOAA survey data contained within the field of view of a single ping of the 3D-FLS. The side view is shown in FIG. 4; the top down view is shown in FIG. 5; and a rotated view is shown in FIG. 6. The three subplots illustrate the depth as a function of position in an area with interesting bathymetry. This fit procedure is applied over many pings.

A Radial Basis Function (RBF) interpolator is one example method that can be used to fit this set of depths at given latitude and longitude within the sensors field of view. For each point in the 3-D point cloud, the latitude and longitude is used to compute the depth, as predicted using the RBF interpolator. If the calculated depth falls within an arbitrarily chosen tolerance of the depth of the point in the 3D cloud, the point is labelled as a bottom. The new array of labels are saved and used to train the model.

Another secondary source of bathymetry data can be crowdsourced data. Bathymetry readings from other vessels can form a consensus depth at one or more points, and can be used as input for the model. In some embodiments, the system can receive recent bathymetry data from other nearby vessels or historic data from a database.

In addition to improving the labelled training data using bathymetric data from NOAA or crowdsourced data, or another trusted source, the data can be improved by other methods as well. For example, it is known that simple down looking echo sounders generally provide a more accurate measurement of the water depth than FLS data. Data from a high resolution multibeam echosounder (MBES) sonar, or a standard single beam echosounder (SBES), included on board nearly all vessels, can thus be used to collect seafloor data along the vessel track. As the vessel moves forward, the echosounder coverage line will overlap with the recent field of view of the forward-looking sonar. The overlapping bottom measurement from the echosounder can be used to improve the labels along the track of the vessel when the training data/labels are generated. In other words, where there is information from an SBES sensor about the depth of the seafloor within the FOV of the FLS, or within the FOV of a recent ping from the FLS, that information is used to label the seafloor in the training set for the development of subsequent models.

Another approach to improving the labelled seafloor data in the training is similar to the above approach, but does not require an additional echosounder sensor. Instead this method relies on the 3D-FLS data itself. It is known that steep down-looking angles from the FLS generally provide a more accurate measurement of the water depth within the beam's footprint than shallow down-looking angles. Due to vessel motion, inaccuracy in sensors, and lower SNR, detections of the seafloor closer to the vessel (with a steeper angle from the FLS sensor to the seafloor) are more accurate than those made further away (at shallower angles). The higher accuracy short range seafloor floor detections from the 3D FLS overlap the long range seafloor detections as the vessel moves forward. Therefore, the system can use the "current" steep angle FLS data as ground truth bathymetry for "past" long range detections to improve training and/or for live training of the model. The higher accuracy short range seafloor 3D FLS detections are used to improve the training labels for the seafloor when the training data/label set is generated, and these updated data are used to improve the seafloor predictions of the model in training. In other words, 3D-FLS data obtained from the same area but taken at different times or angles may be used to improve its own dataset.

Figure 7:
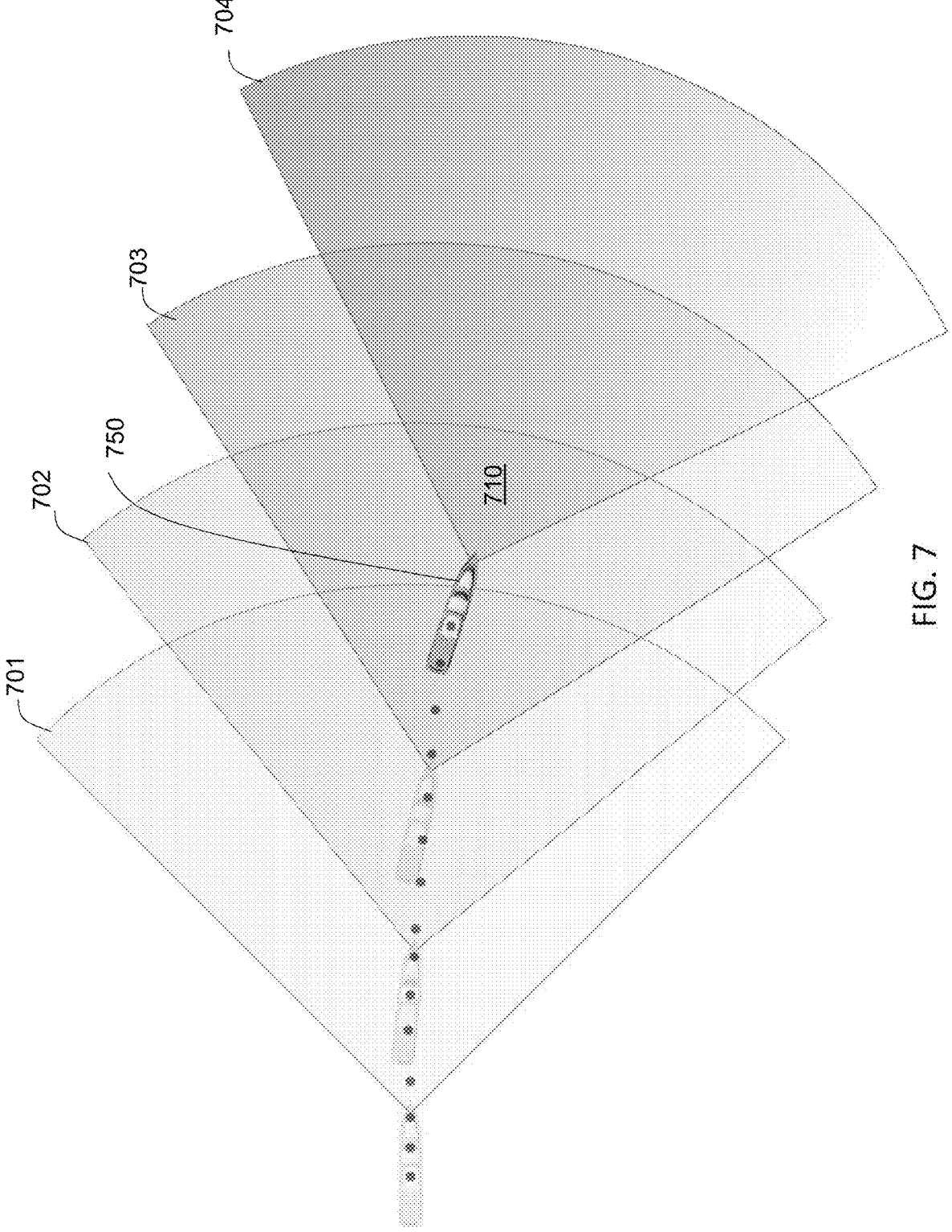
FIGS. 7 and 8 illustrate data collection along the path of a moving vessel.
Figure 8:
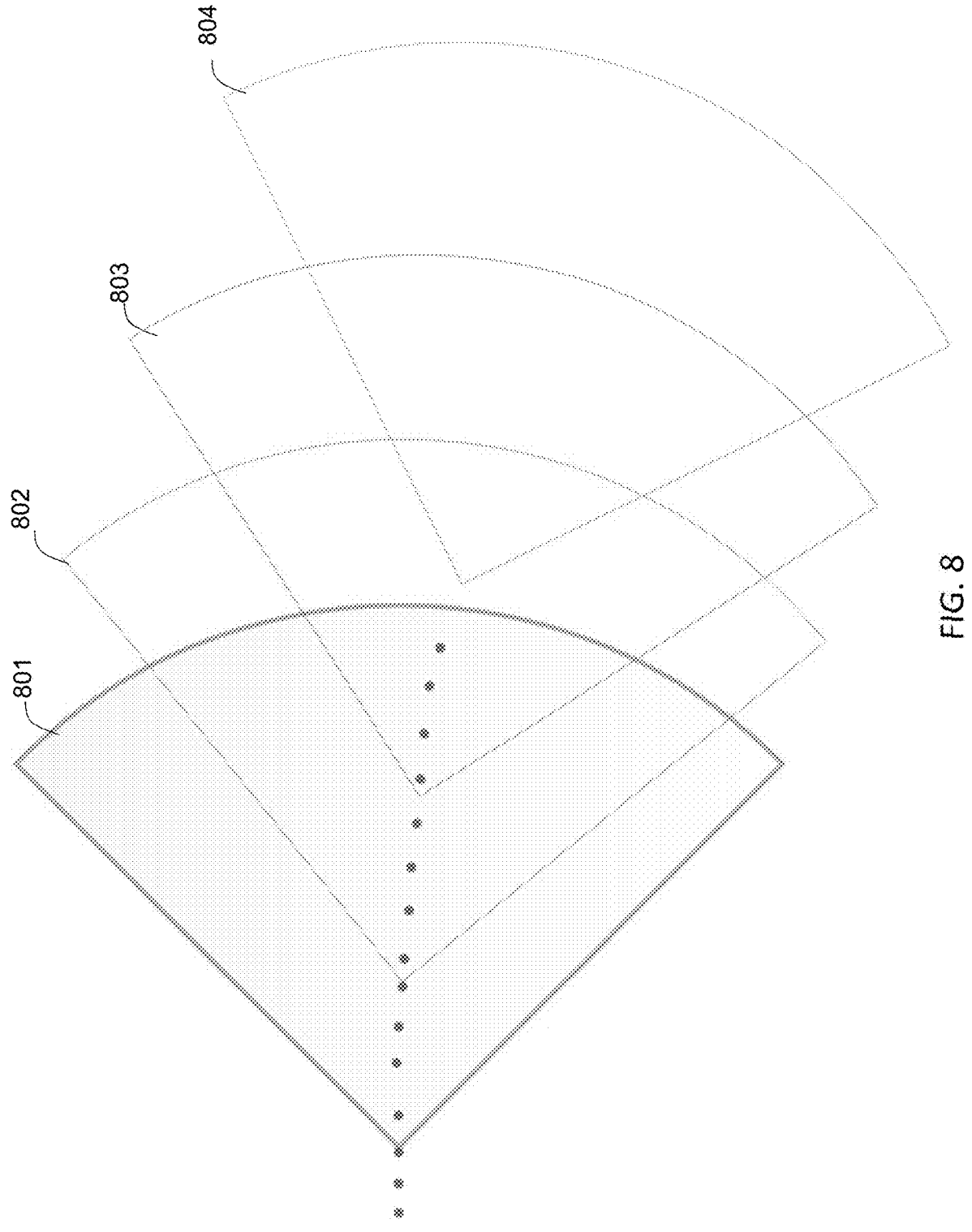

This overlap is shown in FIGS. 7 and 8. In FIG. 7, a vessel 750 is shown moving in a forward direction and obtaining 3D-FLS data in a series of pings 701-704 as the vessel advances. 3D-FLS has a wedge shaped FOV in front of the vessel, covering a much wider swath than an echosounder. Each wedge shaped ping is represented in the figure by the 90° circular segments originating from the bow of the vessel. As the vessel moves over time, it travels through the areas that it has previously pinged, thereby generating multiple data points corresponding to the same seafloor locations but obtained from different angles.

Ping 701 represents the coverage zone at time $t_1$. Pings 702, 703, and 704 are the coverage zones at times $t_2$, $t_3$, and $t_4$, respectively. These pings can be for example at 1.6-second intervals. As can be observed in the figure, the wedge-shaped region labeled 710 is covered by pings 702, 703, and 704. At time $t_2$, ping 702 collects data from region 710 from a distance of perhaps 500 to 1,000 meters away, and at a shallow angle. At time $t_3$, the vessel 750 has advanced closer to region 710 and ping 703 obtains additional data points at a somewhat steeper angle. At time $t_4$, region 710 is now quite close to the vessel 750, and the data collected by ping 704 is at a steep angle. Steep downlook angles have little impact from sound speed variations, and so the highest accuracy angles from the forward looking sonar are when the vessel is directly above the target. The data collected about region 710 by ping 704 can be considered the closest to the ground truth for that region (from among pings 701-704). Each reading as the vessel advances is more accurate than the last reading, meaning that the additional data collected on a region can be compared to the historic readings from further away, and in this way the successive pings provide overlapping data with which to train the algorithm, allowing the model to give more accurate readings in the future.

In some embodiments, the overlapping 3D-FLS data can be combined with echosounder data as described above. In FIG. 7, vessel 750 also obtains soundings from a SBES at each point indicated along its path.

As shown in FIG. 8, recent soundings from the vessel's echosounder or highest accuracy forward looking sonar angles can be georeferenced to the coverage zone of a past forward looking sonar ping from a past location of the vessel. Sonar coverage zone 801 indicates the past coverage zone location of interest, onto which recent soundings from the echosounder or coverage zones 802-804 can be mapped.

In addition to improving the quality of the labeled seafloor data, the presently disclosed systems and methods improve in-water target (IWT) labels in a number of ways. IWTs refer to detections in the water column that are large enough to be navigational hazards, such as submerged rocks, shipping containers, icebergs, or uncharted features. As discussed above, wakes, strong currents, and interference from other vessel's engines can also make decoupling the signal from the noise difficult. Displaying this information in a useful way requires eliminating as much of the noise as possible while keeping any IWT detections that may correspond to a navigational hazard.

To achieve this, the IWT labels in the training data for the machine learning model are improved using both 'positive' examples (i.e., to reinforce features that the model should detect, such as buoy's, vessels, shorelines, and charted rocks) and 'negative' examples (i.e., to reinforce features that the model should ignore, such as vessel wakes). Manually labeled data was already discussed above, and can correspond to both positive and negative examples.

Another approach to improving IWT data involves generating IWT labels using data extracted from nautical charts. For example, vector format navigational charts contain important information about the location of rock piles and bottom features, but also information about the locations of buoys, shorelines, bridge pilings, piers, and shipwrecks. This information is extracted into a database in the area of interest, and used to improve the IWT labels when the training data/labels dataset is generated for 3D-FLS data in that same area.

This approach uses static information to improve labels, but does not include any information about the dynamics of the current environment. Other approaches provide information about the current environment, and these can be used as an alternative to or in conjunction with nautical charts or manually input labels.

Several sources of dynamic information about the operational environment of the FLS are available and can be incorporated into the training data. For example, many types of relevant sonar targets also generate radar reflections, such as buoys, shorelines, piers, and perhaps most importantly, other vessels. Radar data indicating the position, speed, and heading of a nearby object such as a vessel, along with the ratio of speed over ground versus speed through water is input into the model and used to estimate the associated wake generated by the vessel. Information about the location and time of the passing vessel's wake is incorporated into the IWT labels when training data/labels are generated.

A similar approach is applied using automatic identification system (AIS) data to obtain position, speed, and heading information about nearby vessels. Like radar, the information from AIS can be easily correlated to vessel wake, and information is used in the same way to improve IWT labels.

Operator observations about the dynamics of the current system operating environment can be used to modify and improve IWT labels as well. For example, the precise location of buoys or ice bergs when they are observed can be recorded by the operator. Then this data stream is used in the same way as the chart, radar, and AIS to improve the IWT labels when the training set is generated.

Using these data, the model can further classify IWTs into one or more subclasses including detections from the seafloor beyond the sonar's bottom mapping range, detections from vessel wakes, detections from external continuous interference sources such as other vessel engine noise, detections from fish and other marine life, detections from vessel hulls, and clutter.

All of the above-referenced sources of data may include other situational data and metadata. These data and metadata can relate to the vessel itself or environmental conditions. For example, input data can include accelerator readings;

gyroscope readings; roll/pitch/heave values; sensor heading, course, and latitude/longitude; and/or vessel speed and course. The data can include environmental factors such as water temperature and salinity; sound speed profile (SSP) or SSP equivalent refraction. The invention accounts for the fact that operating environment of sonars changes as the vessel travels, and performance of sonars is affected by several parameters of the water on which they operate. The algorithm can account for the non-constant speed of sound in water. The system can estimate the sound speed in its surroundings in real time.

Embodiments of the invention are implemented in a computer environment. A processor configured to operate the machine learning algorithm is connected to one or more input sources of data, such as a 3D-FLS system, an echo-sounder system, other sensors, a source of manually labeled data, or a remote database.

Figure 9:
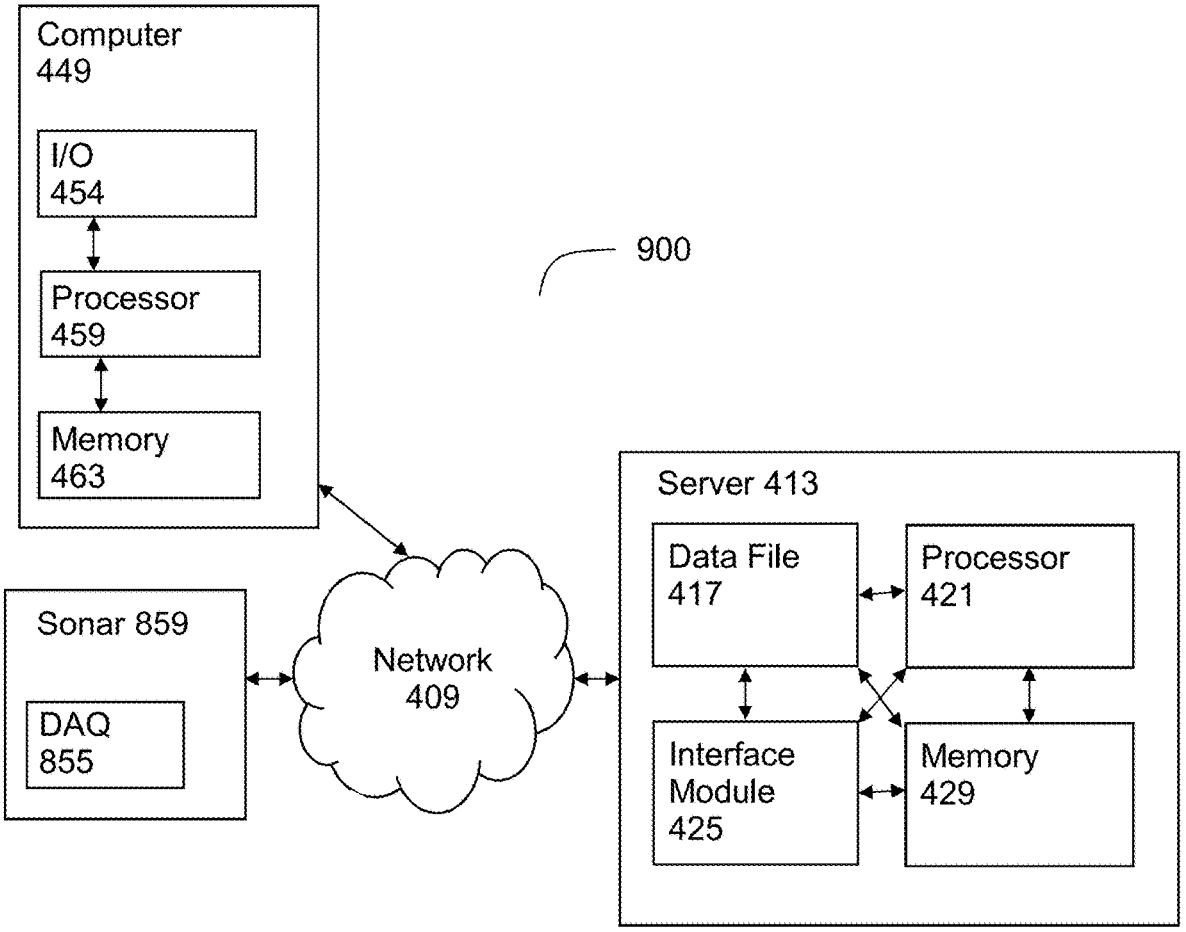
FIG. 9 shows an example computer environment for use with the present invention.

In some embodiments, a user such as a sonar operator interacts with a visual interface and inputs labels or parameters or makes a selection. Inputs from a user or from another data source are received by a processor in an electronic device such as, for example, computer 449. The data can be rendered into a visible display. As shown in the exemplary system shown in FIG. 9, sonar system 859 which includes a data acquisition module 855 communicates with computer 449 as well as server 413 over network 409. Data may be obtained by other sensors or other databases as well. In some embodiments, an operator uses computer 449 to control system 900 or to receive data. Data may be displayed using an I/O 454, which may include a monitor. Any I/O may include a keyboard, mouse or touchscreen to communicate with any of processor 421, 459, for example, to cause data to be stored in any tangible, nontransitory memory 463, or 429. Server 413 generally includes an interface module 425 to effectuate communication over network 409 or write data to data file 417. Methods of the invention can be performed using software, hardware, firmware, hardwiring, or combinations of any of these. Features implementing functions can also be physically located at various positions, including being distributed such that portions of functions are implemented at different physical locations (e.g., sonar 859 in one location and server in another, for example, with wireless or wired connections).

Processors suitable for the execution of computer program include, by way of example, both general and special purpose microprocessors, and any one or more processor of any kind of digital computer. Generally, a processor will receive instructions and data from a read-only memory or a random access memory or both. The essential elements of the computer are a processor for executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, (e.g., EPROM, EEPROM, NAND-based flash memory, solid state drive (SSD), and other flash memory devices); magnetic disks, (e.g., internal hard disks or removable disks); magneto-optical disks; and optical disks (e.g., CD and DVD disks). The processor and the memory can be supplemented by, or incorporated in, special purpose logic circuitry.

The subject matter described herein can be implemented in a computing system that includes a back-end component (e.g., a data server 413), a middleware component (e.g., an application server), or a front-end component (e.g., a client computer 449 having a graphical user interface 454 or a web browser through which a user can interact with an implementation of the subject matter described herein), or any combination of such back-end, middleware, and front-end components. The components of the system can be interconnected through network 409 by any form or medium of digital data communication, e.g., a communication network. Examples of communication networks include cell networks (3G, 4G), a local area network (LAN), and a wide area network (WAN), e.g., the Internet.

Where methods of the invention employ a client/server architecture, steps of methods of the invention may be performed using the server 413, which includes one or more of processors and memory, capable of obtaining data, instructions, etc., or providing results via an interface module or providing results as a file. The server 413 may be provided by a single or multiple computer devices, such as the rack-mounted computers sold under the trademark BLADE by Hitachi. The server 413 may be provided as a set of servers located on or off-site or both. The server 413 may be owned or provided as a service. The server 413 or the storage may be provided wholly or in-part as a cloud-based resources such as Amazon Web Services or Google. The inclusion of cloud resources may be beneficial as the available hardware scales up and down immediately with demand. The actual processors—the specific silicon chips—performing a computation task can change arbitrarily as information processing scales up or down. In an embodiment, the server 413 includes one or a plurality of local units working in conjunction with a cloud resource (where local means not-cloud and includes or off-site). The server 413 may be engaged over the network 409 by the computer 449 and either or both may engage storage. In system 400, each computer preferably includes at least one processor coupled to a memory and at least one input/output (I/O) mechanism.

Deep-learning algorithms rely heavily on graphical processing units (GPUs) to perform learning as there are often millions of parameters to be determined. In the deployment of the models, the inference, recognition or segmentation step may also need such powerful parallel processing as offered by GPUs requiring therefore that deployment might, depending on the model and amount of input data, require specialized hardware, in addition to a CPU, to run efficiently. The GPUs are typically housed on graphics cards. As such, the deployment can use a regular PC with a graphics card or may instead use servers housed in the cloud. This suggests that one realization of these methods would involve pushing the image data to the cloud where the processing occurs, ahead of retrieving the information locally. The receiving device could then be a computer (PC), or a smartphone or tablet.

The subject matter described herein can be implemented as one or more computer program products, such as one or more computer programs tangibly embodied in an information carrier (e.g., in a non-transitory computer-readable medium) for execution by, or to control the operation of, data processing apparatus (e.g., a programmable processor, a computer, or multiple computers). A computer program (also known as a program, software, software application, app, macro, or code) can be written in any form of programming language, including compiled or interpreted languages (e.g., C, C++, Perl), and it can be deployed in any form, including as a stand-alone program or as a module, component, subroutine, or other unit suitable for use in a computing environment. Systems and methods of the invention can include programming language known in the art, including, without limitation, C, C++, Perl, Java, ActiveX, HTML5, Visual Basic, or JavaScript.

A computer program does not necessarily correspond to a file. A program can be stored in a portion of file 417 that holds other programs or data, in a single file dedicated to the program in question, or in multiple coordinated files (e.g., files that store one or more modules, sub-programs, or portions of code). A computer program can be deployed to be executed on one computer or on multiple computers at one site or distributed across multiple sites and interconnected by a communication network.

A file can be a digital file, for example, stored on a hard drive, SSD, CD, or other tangible, non-transitory medium. A file can be sent from one device to another over network 409 (e.g., as packets being sent from a server to a client, for example, through a Network Interface Card, modem, wireless card, or similar).

Writing a file according to the invention involves transforming a tangible, non-transitory computer-readable medium, for example, by adding, removing, or rearranging particles (e.g., with a net charge or dipole moment) into patterns of magnetization by read/write heads, the patterns then representing new collocations of information desired by, and useful to, the user. In some embodiments, writing involves a physical transformation of material in tangible, non-transitory computer readable media with certain properties so that optical read/write devices can then read the new and useful collocation of information (e.g., burning a CD-ROM). In some embodiments, writing a file includes using flash memory such as NAND flash memory and storing information in an array of memory cells include floating-gate transistors. Methods of writing a file are well-known in the art and, for example, can be invoked automatically by a program or by a save command from software or a write command from a programming language.

Example

CNN-based models were investigated to determine their suitability for analyzing 3D-FLS data and to assess which architecture and parameters to use. A large number of possible network architectures and combinations of hyper-parameters can be used with the present invention in addition to the examples presented here.

A dataset of 1450 3D-FLS pings was recorded for use as the baseline training set. The pings included in the dataset come from a variety of different boat trips on different days in different locations. The dataset was further split into 1,187 pings for training and 263 pings for validation. Each model tested was implemented in python using Keras and Tensorflow. They were trained on a computer with an Nvidia GTX 1070 GPU with 8 GB of dedicated memory. A batch size of 1 was used for all of the 3D versions of the CNN models, as it was required to fit the data onto the GPU. Each epoch took approximately 5 hours to complete, and the models were run for 10 epochs each. The 10 epoch limit was chosen empirically so that the loss and accuracy were not changing much from one epoch to the next. The 2D versions of the models were run on a batch size of 10 for roughly 10 epochs or until the loss became stationary, and the runtime was 1.5 hours per epoch on the same system. For both the 2D versions of U-Net and V-Net, one version of the model with all volumetric convolutions switched with 2D convolutions, but with the number of features kept constant. A second 2D version of each model was created with a greater number of trainable parameters by increasing the number of filters used in the convolutional layers.

The Adam optimizer was used to train all models, and categorical cross entropy was chosen as the loss in all cases. Due to an imbalance in the number of background points in the 3D-FLS data compared to the number of points representing a detection, two different weighting methods were tested. The first was a sample weighting approach which used the frequency of a class within a ping to weight each sample, and in the second the weight was calculated using the frequency of a given class over the entire dataset. The latter method produced models with higher training and validation accuracy.

The results of running all of the models considered in this work are tabulated in Table 1. In the table, CW=Class weighted loss function; SW=sample weighted loss function; the categorical cross entropy loss function was used for all cases; and the Adam optimization algorithm with default Keras parameters was used to train the parameters. The "*" represents a model with increased features in the convolutional layers to increase the number of trainable parameters.

TABLE 1

| Model | Epochs | Parameters | Training Acc. | Valid. Acc. |
|---|---|---|---|---|
| 2D UNet* | 10 | 385943 | 0.8399 | 0.8532 |
| 2D UNet (CW) | 10 | 41697 | 0.7989 | 0.8361 |
| 3D UNet (CW) | 10 | 123957 | 0.948 | 0.9459 |
| 3D UNet (SW) | 10 | 123957 | 0.9456 | 0.8932 |
| 2D VNet* (CW) | 10 | 216581 | 0.8216 | 0.8504 |
| 2D VNet (CW) | 10 | 88647 | 0.771 | 0.9111 |
| 3D VNet (CW) | 10 | 255507 | 0.9507 | 0.9507 |
| 3D VNet (SW) | 10 | 255507 | 0.9366 | 0.9421 |

In regards to the quantitative metrics of accuracy over the training and validation, the 3D V-Net model with class weighted loss performed better. However, in both the training and validation data, despite the class weighting, this model converged to predict very little of the seafloor class (the most underrepresented class). In comparison, the 3D U-net model achieved similar accuracy, but performed qualitatively better, in the sense that it predicts classes with frequencies closer to those in the training data. For this reason, the 3D U-net model using the class weighting approach was the best candidate for further development out of the models investigated.

Figure 10:
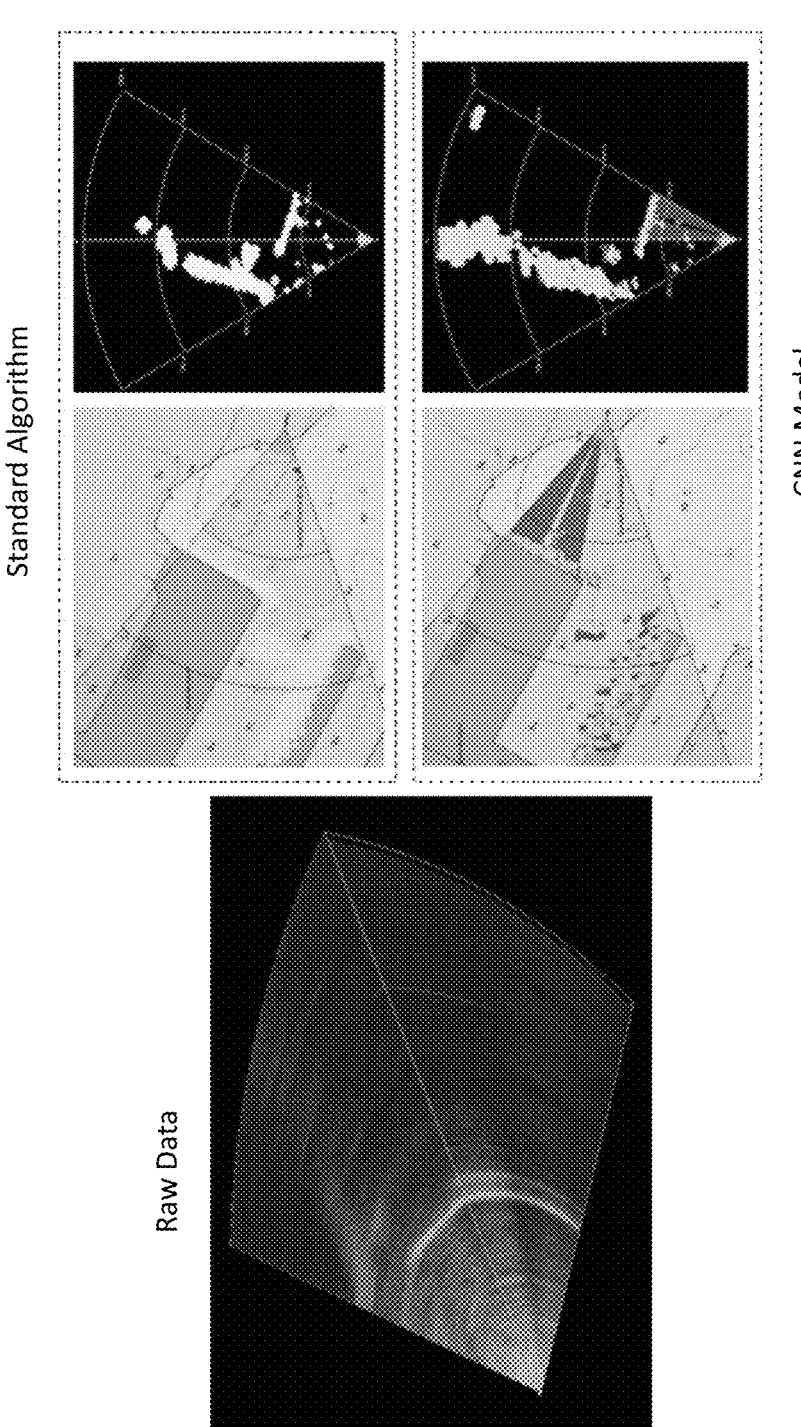
FIGS. 10 and 11 show a sample of the performance of two volumetric models.
Figure 11:
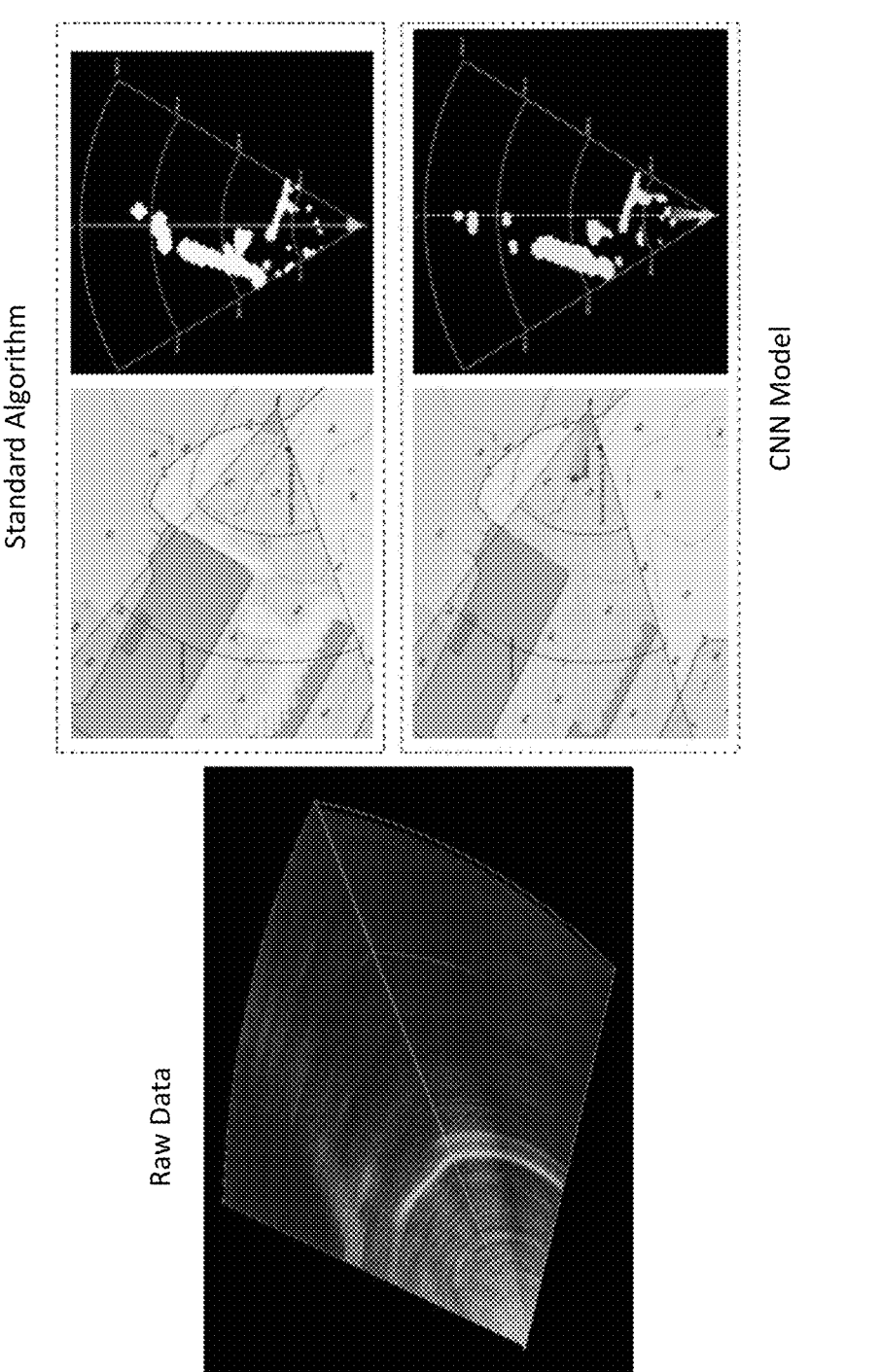

An example of the qualitative performance of the model is given in FIGS. 10 and 11 which show a comparison of the qualitative output of the 3D U-Net model and traditional detection model for a given input. The volumetric input data is shown on the left, with the traditional results and CNN based results in the top and bottom right respectively. The ping used to generate FIGS. 10 and 11 was not included in the training data set for the CNN models. In both FIGS. 10 and 11, the CNN models are able to detect the in-water target features that are detected using the traditional processing corresponding to the edges of a pier. However, there are clearly some additional detections that do not exist in the training data. The CNN model used to generate FIG. 11 is the same 3D U-Net model with weighted loss. However it was trained using the AdaDelta optimizer for 5 epochs instead of Adam, and without normalizing the input per ping. This model seems to have less 'false positive' detections. The seafloor detection generated by both CNN models in FIGS. 10 and 11 agrees well with the standard algorithm at short range. However both CNN models detect additional deep seafloor targets at longer range. The long range detections are not present in all pings, and the seafloor agrees well with the traditional algorithm in some of the other pings investigated.

The results show that these available CNN models can replace a traditional detection algorithm. However, the models can be further refined with the methods disclosed herein to reduce superfluous detections, especially of the seafloor. While these CNN models reproduced all of the features detected by the traditional detection algorithm, they also replicated undesirable detections such as engine noise and wakes from passing vessels. These undesirable detections can be reduced or eliminated with the strategies discussed above.

A subset of the training data was improved using the automated process previously described and used to continue the training of the 3D U-Net model. The model can be further improved using a greater number of trainable parameters or additional layers. Further, additional features can be added to the input of the CNN model in addition to the backscatter strength. For example, including the Cartesian position of each element in the point cloud along with the backscatter strength allows the network to handle the differences between the Cartesian and spherical coordinate representation of the data.

What is claimed is:

1. A method for detecting and classifying underwater features, the method comprising:
  operating a three-dimensional forward-looking sonar (3D-FLS) sensor to obtain 3D-FLS data from the sensor, wherein the 3D-FLS data comprises a 3-dimensional point cloud of target strength values;
  providing the 3D-FLS data as input to a machine learning system that includes a neural network, wherein the neural network has been trained on training data comprising 3D-FLS training data comprising 3-dimensional point cloud of backscatter strengths and bathymetric survey data from a reference source; and
  using the machine learning system to detect a feature in the 3D-FLS data and classify the feature as seafloor or an in-water target.

2. The method of claim 1, wherein the 3-dimensional point cloud of target strength values is formed from backscatter strength data.

3. The method of claim 1, wherein the input to the machine learning system further comprises metadata comprising one or more of: sensor acceleration readings, gyroscope readings, sensor roll orientation, sensor pitch orientation, sensor heave, sensor heading, sensor course, sensor latitude, sensor longitude, water temperature, water salinity, and sound speed profile.

4. The method of claim 1, wherein the training data further include secondary data from one or more secondary sources.

5. The method of claim 4, wherein the secondary data comprise one or more of:
  manually labeled volumetric backscatter strength data;
  multibeam echosounder data (MBES);
  single beam echosounder data (SBES);
  3D-FLS data obtained from the same sonar system at a different angle or time;
  nautical chart data;
  radar data; and
  automatic identification system (AIS) data.

6. The method of claim 5, wherein the SBES training data comprises labelled SBES sensor information about a depth of seafloor within a field of view of the 3D-FLS sensor.

7. The method of claim 1, wherein the bathymetric survey data have been collected using a high-resolution multibeam echosounder (MBES).

8. The method of claim 1, wherein the training data further include secondary data that comprise information about position, speed, and heading of an object.

9. The method of claim 1, further comprising sub-classifying the in-water targets as one or more of: wakes; buoys; fish; boats; and engine noise.

10. The method of claim 1, wherein the machine learning system generates an output comprising a classification for each point in the 3D-FLS data, the classification representing a likelihood that the point corresponds to (i) seafloor, (ii) an in-water target, or (iii) background.

11. The method of claim 1, wherein the bathymetric survey data is added to a database within the training data.

12. The method of claim 11, wherein the database contains one or more of a location and depth of a survey point.

13. The method of claim 12, wherein the training data further comprises applying a fit procedure to data obtained from querying the database for a survey point within a field of view of the 3D-FLS sensor.

14. The method of claim 13, wherein the fit procedure is a Radial Basis Function interpolator to fit the data at a given latitude and a longitude within the field of view of the 3D-FLS sensor.

15. A system for real-time detection and classification of underwater features, the system comprising:
  a three-dimensional forward-looking sonar (3D-FLS) device comprising a 3D-FLS sensor, wherein the 3D-FLS device is operable to insonify a region ahead of a vessel and collect 3D-FLS data from the 3D-FLS sensor, wherein the 3D-FLS data comprises a 3-dimensional point cloud of target strength values; and
  a computing system coupled to the 3D-FLS device, the computing system comprising a neural network, wherein the neural network has been trained on:
(i) labeled 3D-FLS training data comprising 3-dimensional point clouds of backscatter strengths; and (ii) bathymetric survey data from a reference source, such that the neural network is operable to detect features in the 3D-FLS data and classify the features as seafloor or in-water targets.

16. The system of claim 15, wherein the 3D-FLS device is configured to be mounted on the hull of a boat.

17. The system of claim 15, wherein the 3-dimensional point cloud of target strength values is formed from backscatter strength data.

18. The system of claim 15, wherein the system collects metadata comprising one or more of: sensor acceleration readings, gyroscope readings, sensor roll orientation, sensor pitch orientation, sensor heave, sensor heading, sensor course, sensor latitude, sensor longitude, water temperature, water salinity, and sound speed profile.

19. The system of claim 15, wherein the neural network is further operable to sub-classify the in-water targets as one or more of: wakes; buoys; fish; boats; and engine noise.

20. The system of claim 15, wherein the neural network generates an output comprising a classification for each point in the 3D-FLS data, the classification representing a likelihood that the point corresponds to (i) seafloor, (ii) an in-water target, or (iii) background.

21. The system of claim 15, further comprising a display for displaying the features with labels indicating their classifications or classification likelihoods.

* * * * *